(12) United States Patent
Szlam et al.

(10) Patent No.: US 8,402,070 B2
(45) Date of Patent: Mar. 19, 2013

(54) TRAINING, CERTIFYING, ASSIGNING AND COLLABORATING AGENTS AMONG MULTIPLE USERS

(75) Inventors: Aleksander Szlam, Alpharetta, GA (US); Karl A. Walder, Marietta, GA (US)

(73) Assignee: Aspect Software, Inc., Chelmsford, MA (US)

( * ) Notice: Subject to any disclaimer, the term of this patent is extended or adjusted under 35 U.S.C. 154(b) by 2120 days.

(21) Appl. No.: 10/449,872

(22) Filed: May 30, 2003

(65) Prior Publication Data

US 2004/0111310 A1 Jun. 10, 2004

Related U.S. Application Data

(63) Continuation of application No. 09/395,498, filed on Sep. 14, 1999, now abandoned.

(51) Int. Cl.
*G06F 17/00* (2006.01)

(52) U.S. Cl. ........ 707/822; 707/610; 707/707; 707/787; 707/795; 707/802

(58) Field of Classification Search .................. 705/1, 7, 705/8, 9; 707/104.1, 610, 707, 787, 795, 707/802, 810, 822
See application file for complete search history.

(56) References Cited

U.S. PATENT DOCUMENTS

| | | | |
|---|---|---|---|
| 5,291,550 A * | 3/1994 | Levy et al. | 379/242 |
| 5,555,179 A | 9/1996 | Koyama | 700/95 |
| 5,758,324 A * | 5/1998 | Hartman et al. | 705/1 |
| 5,765,033 A | 6/1998 | Miloslavsky | 709/206 |
| 5,926,539 A | 7/1999 | Shtivelman | 379/266.01 |
| 5,946,387 A | 8/1999 | Miloslavsky | 379/265.12 |
| 5,953,332 A | 9/1999 | Miloslavsky | 370/352 |
| 5,953,405 A | 9/1999 | Miloslavsky | 379/265.01 |
| 6,002,760 A | 12/1999 | Gisby | 379/266.01 |
| 6,021,428 A | 2/2000 | Miloslavsky | 709/206 |
| 6,044,145 A | 3/2000 | Kelly et al. | 379/265.02 |
| 6,044,368 A | 3/2000 | Powers | 707/2 |
| 6,067,357 A | 5/2000 | Kishinsky et al. | 379/265.02 |
| 6,108,711 A | 8/2000 | Beck et al. | 709/242 |
| 6,138,139 A | 10/2000 | Beck et al. | 709/202 |
| 6,167,395 A | 12/2000 | Beck et al. | 707/3 |
| 6,170,011 B1 | 1/2001 | Beck et al. | 709/224 |
| 6,175,563 B1 | 1/2001 | Miloslavsky | 370/352 |
| 6,175,564 B1 | 1/2001 | Miloslavsky | 370/352 |
| 6,185,292 B1 | 2/2001 | Miloslavsky | 379/265.01 |
| 6,223,165 B1 * | 4/2001 | Lauffer | 705/8 |
| 6,345,305 B1 | 2/2002 | Beck et al. | 709/242 |
| 6,373,836 B1 | 4/2002 | Deryugin et al. | 370/352 |
| 6,389,007 B1 | 5/2002 | Shenkman et al. | 370/352 |
| 6,393,015 B1 | 5/2002 | Shtivelman | 370/352 |
| 6,732,156 B2 | 5/2004 | Miloslavsky | 709/206 |

* cited by examiner

*Primary Examiner* — Sana Al Hashemi
(74) *Attorney, Agent, or Firm* — Bourque and Associates, PA

(57) ABSTRACT

Automatically accepting applications, and testing, training, certifying, assigning, allocating, controlling, and scheduling remote agents. An applicant (100) transmits an application to a remote agent center (RAC) (130) via a Communications Network (120). The application contains the person's profile, training, and experience. The RAC validates the skills via testing or third party confirmation, accepts the person as a remote worker, certifies the person's skill levels, and places the person in the remote worker pool. The remote worker can also obtain remote training on new or additional topics. The RAC evaluates the business demands of an external party, identifies remote workers with the needed skills who are available, and transmits the work at the appropriate time to the remote workers. The work is transmitted via or through the RAC. The external parties thus do not have to recruit, train, or test persons, or be concerned with staffing issues.

42 Claims, 5 Drawing Sheets

TRAINING, CERTIFYING, ASSIGNING AND COLLABORATING AGENTS AMONG MULTIPLE USERS

PRIORITY CLAIM

This is a continuation of U.S. patent application Ser. No. 09/395,498 filed Sep. 14, 1999.

TECHNICAL FIELD

This invention relates to allocating, using, training, supervising, evaluating, and controlling remote agents through a single entity for the benefit of multiple external business users.

BACKGROUND OF THE INVENTION

There has been a rapid and continuing increase in the number of remote contact businesses such as telephone sales and collections, customer service centers, Internet service centers, Internet portals, etc. The services offered are multiple, but the businesses are related in that all contacts are provided from a remote location. Thus, the consumer communicates with the business via a Communications Link such as the telephone, Internet, extranet, intranet, cable network, satellite network, etc. This has created an increasing need for qualified agents to staff those contact businesses. However, the industry has a problem with finding agents, recruiting them, training them, retaining them, and keeping them fully employed at all times.

Coupled with the increase in demand is the increase in connectivity. Ten years ago telephones were the primary means of communicating, but today there are many means such as telephones, the Internet, intranet, extranet, satellite networks, cable networks, pagers, facsimile devices, etc.

In addition, the prospective agents may not be located near the contact center. The contact center may be located in one town, and the persons who are looking to become agents may be located in another town, far away, or the agents may have inadequate transportation or insufficient time to waste traveling to and from the contact center, or the agent may simply desire to work at home.

Further, an agent at a first contact center may have been trained on one product or service, but the company originally providing that product or service no longer provides that product or service, so that contact center may no longer need an agent trained on that product or service. However, another company does provide such a product or service, but that company does not use that first contact center, but uses a second, different contact center. As a result, the first contact center must train the agent for another product or service, and the second contact center must train an agent on that product or service. Thus, both contact centers must train agents, and the first agent's expertise and training have been wasted.

SUMMARY OF THE INVENTION

The present invention provides for the training of agents.

The present invention also provides for the certifying of agents as being trained on specified products.

The present invention also provides for allocating of trained agents among multiple business users.

The present invention also provides for the remote training and certifying of agents.

The present invention also provides for the assignment of remote agents.

The present invention provides for training and certifying applicants for skill areas, for allocating remote workers, for allocating remote workers among a plurality of external parties, for allocating a plurality of remote workers to assist an external party, and for generating an agent resource pool.

One aspect of the present invention includes the steps of: electronically receiving an application and a completed test from an applicant for a position; evaluating said completed test; if said test was successfully completed, then electronically sending a training program for a predetermined area to said applicant; electronically receiving said training program as completed by said applicant; evaluating said completed training program; and, if said training program was successfully completed, then automatically certifying said applicant for said predetermined area.

Another aspect of the present invention includes the steps of: providing a remote agent center; certifying a plurality of remote workers in a plurality of skill areas; placing said certified remote workers in a resource pool; receiving a request from an external party for a remote worker having a specified skill; inspecting said resource pool to identify remote workers in said resource pool which are certified for said specified skill; assigning at least one such identified remote worker to serve said external party; and connecting said identified remote worker to said external party through said remote agent center.

Another aspect of the present invention includes the steps of: receiving a request for a remote worker having a specified skill from a first external party; receiving a request for a remote worker having said specified skill from a second external party; identifying a remote worker having said specified skill; connecting said identified remote worker to said first external party on an as-needed basis; and connecting said identified remote worker to said second external party on as-available basis.

Another aspect of the present invention includes the steps of: receiving a request for a first remote worker having a first specified skill from an external party; identifying a remote worker having said first specified skill; connecting said identified first remote worker to said external party; receiving a request for a second remote worker having a second specified skill from said external party; identifying a second remote worker having said second specified skill; and connecting said second identified remote worker to said external party.

Another aspect of the present invention includes the steps of: receiving a request from an external party for remote workers having skills in a specified area; identifying remote workers having said skills in said specified area; determining if there are sufficient identified remote workers to fulfill said request; if there are not sufficient identified remote workers to fulfill said request then receiving an application and a completed test from an applicant for a position; evaluating said completed test; if said test was successfully completed, then sending a training program for said specified area to said applicant; receiving said training program as completed by said applicant; evaluating said completed training program; and if said training program was successfully completed, then certifying said applicant for said specified area.

Another aspect of the present invention includes the steps of: receiving requests from external parties for remote workers having skills in a specified area; identifying remote workers having said skills in said specified area; determining if there are sufficient identified remote workers to fulfill said requests; if there are not sufficient identified remote workers to fulfill said requests then: receiving an application and a completed test from an applicant for a position; evaluating said completed test; if said test was successfully completed, then sending a training program for said specified area to said applicant; receiving said training program as completed by said applicant; evaluating said completed training program; and if said training program was successfully completed, then certifying said applicant for said specified area.

Another aspect of the present invention includes the steps of: publicizing a need for remote agents; receiving an application via the Internet from an applicant for a position as a said remote agent; electronically evaluating said applicant to determine skill sets of said applicant; electronically comparing said skill sets of said applicant with skill sets required for business needs; confirming at least one skill set of said applicant; and, if said at least one skill set of said applicant is confirmed, then certifying said applicant for a position as a remote agent for business needs appropriate for said at least one skill set of said applicant.

Other objects, features, and advantages of the present invention will become apparent upon reading the following description of the preferred embodiment, when taken in conjunction with the drawings and the claims.

DETAILED DESCRIPTION OF THE INVENTION

Figure 1:
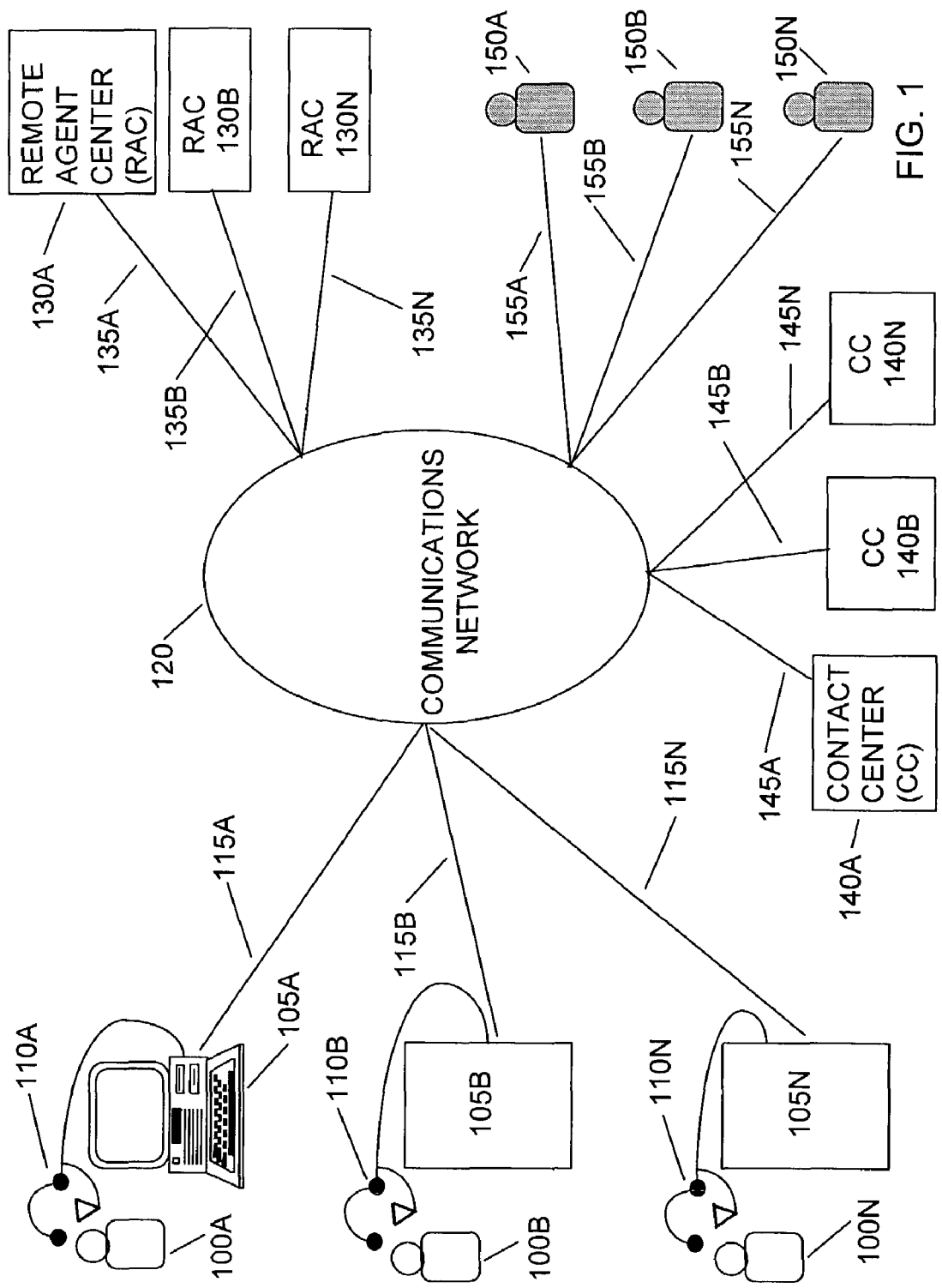
FIG. 1 is an illustration of the preferred embodiment of the present invention.
Figure 2A:
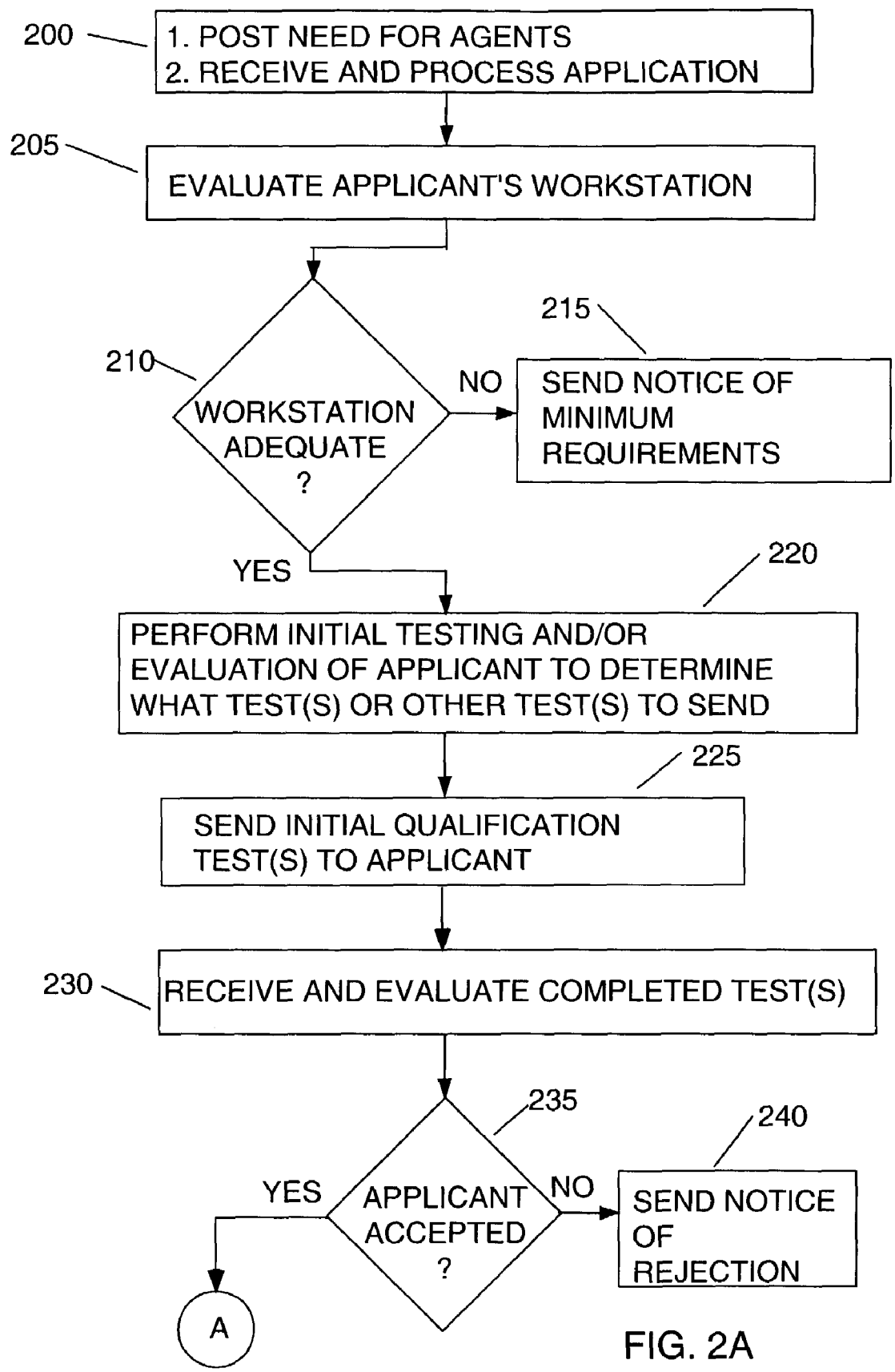
FIGS. 2A-2D are a flow chart illustrating the process of the present invention.
Figure 2B:
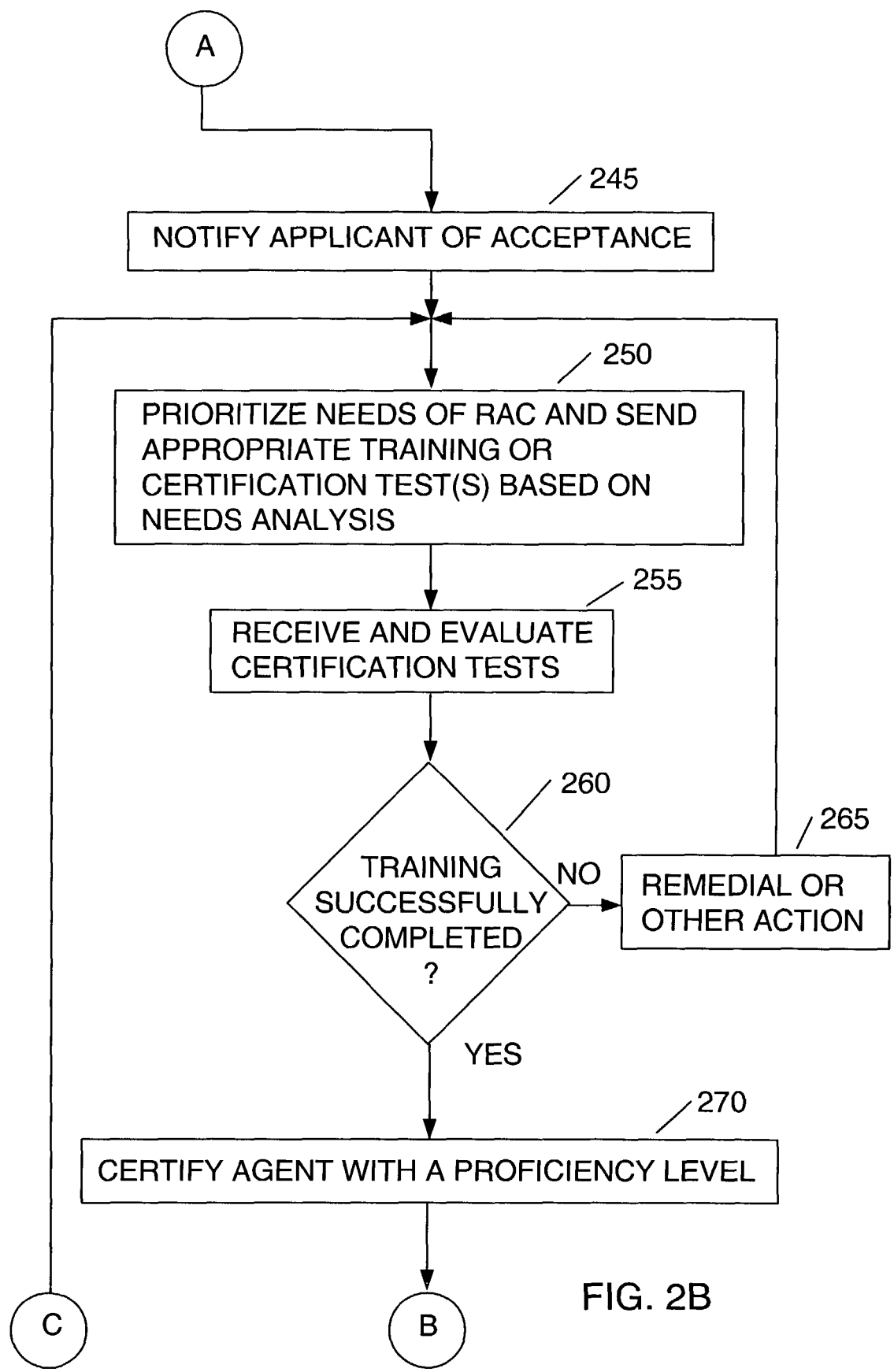
Figure 2C:
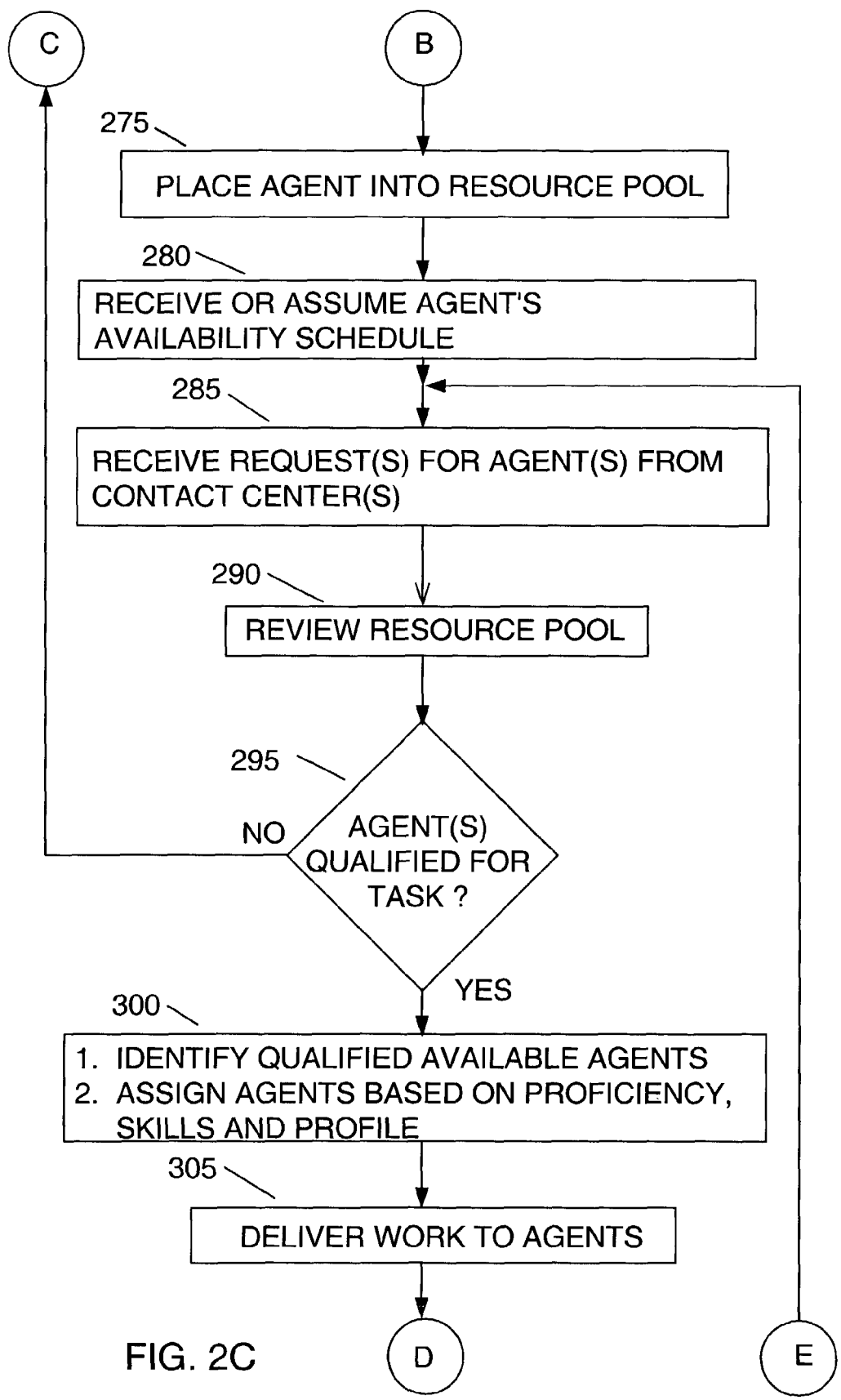
Figure 2D:
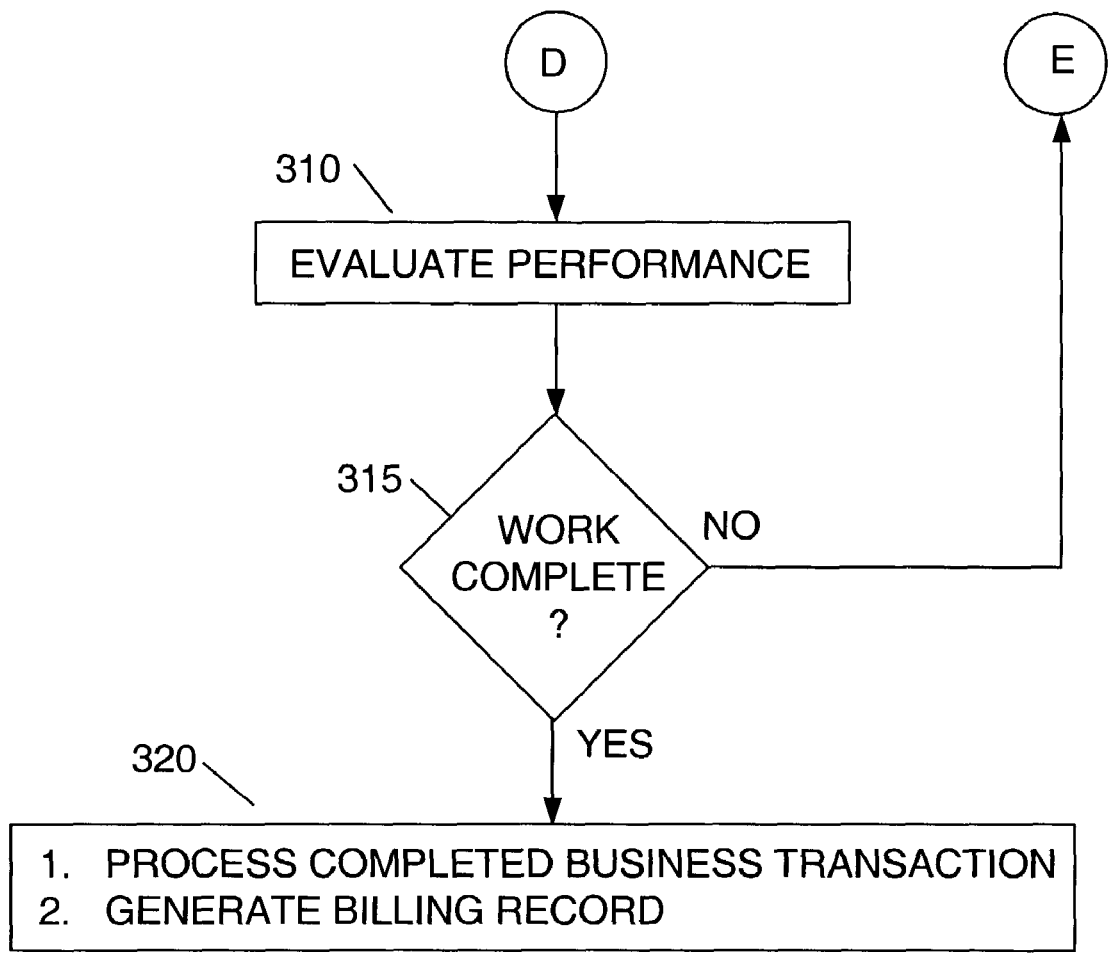

FIG. 1 is an illustration of the preferred embodiment of the present invention. A plurality of persons 100A-100N aspire to be agents for contact centers. However, for various reasons the agents may not want to work in the contact center. However, these persons 100A-100N have Computing Means 105A-105N which are connected to Communications Links 115A-115N via an internal or external communications device, such as a modem, cable TV adapter, satellite adapter, etc. "Computing Means" are computers, personal computers, data processors, personal assistants, network computers, palmtops, etc. "Communications Links" are telephone lines, ISDN lines, cable lines, cellular networks, etc. Therefore, these persons have access to a Communications Network 120, which may include, for example, telephone networks, the Internet, intranets, extranets, cellular networks, ATM lines, satellite networks, etc. A Computing Means, such as 105A, in addition to the standard components of a monitor and a keyboard (not numbered separately), may have and preferably does have audio communications means 100A-110N, such as a telephone set, or a headset which includes a microphone, or a handset (not shown). These agents are designated "remote workers" or "remote agents" in that they can work from anywhere in the world so long as they have the necessary connectivity tools 105 and 110 and Communications Links 115.

A remote agent center (RAC) 130A-130N also has Communications Links 135A-135N connecting it to the Communications Network 120. The RAC 130 may be any of a number of businesses such as, but not limited to, an Internet service provider, Internet portal, remote services provider, or remote worker agency. The RAC 130 has support equipment such as, but not limited to dedicated computer servers, dialers, and switches that enable it to be a conduit for telephone calls, electronic mail, electronic chatting, instant messaging, and URL sharing. Said support equipment is well known in the industry and available. Through the Communications Network 120, the RAC 130 is also connected to a plurality of contact centers 140A-140N. An example of one type of contact center is one which processes inbound telephone calls from and/or outbound telephone calls to customers, as well as providing for collaborations with customers via the Internet. Another example of a contact center is a telephone call center.

Contact centers (CC) 140A-140N also have Communications Links 145A-145N connecting them to the Communications Network 120. The contact center is a business primarily tasked with communicating with consumers or out-sourcing business tasks. The contact center may be, but is not limited to, a customer service department, telephone sales center, collection agency, etc. Through the Communications Network 120, the CC's 140 are also connected to a plurality of Customers 150A-150N.

Customers 150A-150N also have Communications Links 155A-155N connecting them to the Communications Network 120. Through the Communications Network 120, the Customers 150 are also connected to a plurality of CC's 140. Therefore, through the Communications Network 120, a remote agent 100 may be connected to a consumer 150 via an RAC 130 and a contact center 140.

In the preferred embodiment, the process of initially evaluating a prospective remote agent 100A for acceptance and future training, if needed, is accomplished remotely, that is, via an electronic means such as the Internet, an intranet, an extranet, or a dial-up, virtual private network. In response to advertisements in one or more media, the prospective remote agent 100A uses the computer 105A to log on to an RAC 130, such as the RAC 130A, via the Communications Network 120. The prospective remote agent 100A then completes a qualifications form and a job interest form and submits them to the RAC 130A. The completion of the electronic forms may be done either while on-line or when off-line. At the RAC 130 the forms are reviewed by an automated system to determine the potential remote agent's qualifications. Alternatively, the forms may be reviewed by a personnel supervisor or employment needs person at the RAC 130A.

If the prospective agent's claimed qualifications are such that they may be verified independently, the RAC 130 should accomplish such verification, preferably automatically. For example, a remote agent 100A may be licensed to perform specific functions such as real estate sales, accounting, or the practice of law. Such qualifications may include a wide array of past accomplishments from licenses to completion of educational courses. The RAC 130A reviews and confirms the qualifications and uses this information to certify the remote agent. Such review and confirmation may be accomplished by an automated system that checks databases to certify the claimed qualifications.

Otherwise, the RAC should specify a set of tests for the prospective remote agent 100A to take given said agent's claimed qualifications. These tests may be in any number of multimedia forms, such as but not limited to, simulations, interactive tests, written tests, video tests, audio tests, combinations thereof, etc. These tests are generally of two different types: those that may be done without the attention of another person, and those that require the attention of another person. Examples of the first type of test are typing speed, typing errors, written foreign language skills, reading foreign language skills, basic spoken foreign language skills, basic speaking skills, basic articulation, math proficiency, etc. These tests may be taken on-line or off-line. Examples of the second type of test are speaking skills, articulation, courtesy, speed of thought, advanced spoken foreign language skills, etc. These tests are preferably performed on-line, such as via an audio connection between the prospective remote agent 100A and an appropriate testing or supervisory person at the RAC 130A. The audio connection may be via the Internet via any of the commercially available voice-over-the-Internet communications programs, or may be via a conventional telephone connection.

Consider typing speed and typing errors tests. The prospective remote agent 100A logs on and these tests are loaded into the prospective remote agent's computer 110A. These tests execute programs that contain time measurements and those programs record the keystrokes and the time of each keystroke. When the prospective remote agent has completed the tests, the prospective remote agent 100A logs on and the results are uploaded to the RAC 130A for evaluation.

For basic oral skills, the prospective remote agent 100A uses the audio communications means 110A. The prospective remote agent 100A logs on and at least some of these tests are loaded into the prospective remote agent's computer 105A. These tests execute programs that contain time measurements, and those programs present questions or facts, orally via audio means such as headset 110A, or visually via the computer 105A, or both, and record the spoken response of the remote agent to those facts or questions. When the prospective remote agent has completed the tests, the prospective remote agent 100A logs on and the results are uploaded to the RAC 130A for evaluation.

Tests for more advanced oral skills may also be administered in this manner. However, the preferred method of administration of more advanced oral skills, and other tests, such as for courtesy, is via the audio communications means 110A, preferably with video support such as via the computer 105A, and wherein the prospective remote agent is directly connected to a person who is qualified to conduct a conversation with the prospective remote agent and evaluate the prospective remote agent's abilities.

Once the claimed qualifications are established via independent verification or testing, a decision can then be made whether to employ the prospective remote agent.

Assuming that the prospective remote agent's qualifications have been verified and/or s/he has performed satisfactorily on the above tests, the prospective remote agent is now accepted for employment by the RAC 130A. The next step, if needed, may be to train or qualify the remote agent. Again, this is preferably accomplished remotely.

The remote agent 100A uses the computer 105A to log on to the RAC 130A via the Communications Network 120. Based upon the application of the remote agent, the agent's qualifications, the test results from above, and the needs of the RAC 130A, the RAC 130A specifies a training program for the agent. (The training program may be no training at this time.) When the agent 100A requests training, the training program is accessed via the agent's computer 105A. The training program may be run on external servers or web sites, downloaded to the agent's computer 105A, mailed to the agent, completed on-line, faxed to the agent, completed at the RAC 130A facility, or otherwise forwarded, provided, or made available to the agent. The remote agent then begins training. The training program may be in any number of multimedia formats and may involve education, instructions and testing on the products and/or services with which the remote agent will be involved. The training program will also typically involve a series of tests that challenge the remote agent's new knowledge, the remote agent's ability to understand various questions and provide the correct answers, etc. Upon the remote agent's completion of each test, the test results are provided to the RAC 130A, such as by leaving the results in the external server or web site, uploading, faxing, mailing, forwarding, etc. Then, any subsequent training programs may be completed in a similar manner.

When the remote agent 100A has completed the training program, the remote agent 100A notifies the RAC 130A. Notification may be automatic following completion of training, or the remote agent may be allowed to or required to take the action necessary to notify the RAC 130A. Training may be complete at this point, or a training or supervisory person at the RAC 130A may then act as a consumer to personally test the remote agent 100A further, or the training or supervisory person at the RAC 130A may monitor a live contact between the agent 100A and a consumer trying to obtain information or discuss the products or services upon which the remote agent 100A has been trained or the training process.

Based upon the remote agent's skill level as established by verification of the agent's qualifications or completion of the training programs for the specified product(s) or service(s), the RAC 130A certifies the remote agent 100A as being qualified to a specific proficiency level for duty for those specified product(s) or service(s). Further, the certification may include a proficiency level of the agent for each skill. The RAC 130A then places the agent 100A into the agent resources pool of the RAC 130A. This agent resources pool has a plurality of agents, each of which is certified as being trained in one or more areas and may be assigned a proficiency or experience level based upon the performance and experience of that agent.

Further, it is contemplated that remote agents will periodically receive update training or training on new offerings. This necessitated by the constantly changing offerings across all industries. Thus, when an agent has been trained on an existing offering, that agent will be able to receive additional training on new replacement products or upgrades or services. The training process will be constant as new products and services are introduced.

Once a remote agent has been accepted for employment and certified to an acceptable level of proficiency, the remote agent is assigned to the agent pool. It is possible that an agent may not need any training if that person already possesses sufficient skills, such as from previous training or experience, to perform work for the RAC 130A. In such a case, the remote agent merely needs to be certified. Once a remote agent has been assigned to the agent pool, every time that the remote agent logs on, the RAC 130A will know the agent's skills, level of proficiency, and availability schedule. Therefore, the agent need not be trained, tested, and certified each time that the person logs on.

Once in the agent pool, each remote agent may specify availability. A set schedule, such as weekly or monthly, may be utilized. In the alternative, or additionally, the RAC 130A may automatically recognize an agent as available when the agent logs onto the RAC 130A. Further, when the RAC 130A has work it may query qualified agents to determine if they are interested in performing the work.

In addition to performing the functions of recruiting, testing, training, and certifying agents, each RAC 130 also performs the function of acting as a clearinghouse or agent center for various contact centers 140A-140N. That is, if a contact center 140 requires agents to service a particular campaign or function, the contact center 140 contacts the RAC 130 and places an order for a specified number of agents having certain qualifications, that is, specified certifications and proficiency levels. The RAC 130 then assigns agents 100 from the resource pool to that contact center 140 based upon the areas in which the agents are certified, their proficiency, their skill levels, and their schedules. Then, as a contact center 140 places or receives contacts, those contacts are routed from the contact center 140 to the RAC 130, which then connects the assigned agents to the contacts.

The contacts may be either synchronous or asynchronous. Synchronous contacts are live connections between a remote agent and customer during which the remote agent transacts business. (An RAC and a CC may be intermediaries, but they do not participate in the contact.) Synchronous contacts include, but are not limited to, an outbound contact campaign and an inbound contact response. Synchronous contacts may be accomplished through any one or combination of the following: the public switched telephone network, a voice over Internet protocol connection, electronic chatting, instant messaging, and URL sharing. Asynchronous contacts are one-way connections between a remote agent and customer through which one party forwards the other party information. (Again, an RAC and a CC may be intermediaries, but they do not participate in the contact.) Asynchronous contacts include, but are not limited to, the delivery of work via telephone, electronic mail, facsimile, and traditional mail services. An asynchronous contact is utilized to deliver information to a remote agent who then uses the information to create a result which the remote agent then sends back to the originator via another asynchronous contact.

In the synchronous contact environment, the agents may be permanently connected ("nailed down") to the contact center 140 via the Communications Network 120 for the duration of the campaign. In either event, the assigned agents appear to be part of the contact center 140. In addition, the desired information, screens, etc., are provided from the contact center 140 to RAC 130, which are then provided to the computers 105 of the assigned agents. In another embodiment, the computers 105 of the assigned agents may be permanently connected ("nailed down") to the contact center 140 for the duration of the campaign. In still another embodiment, the contact center 140 may send a predetermined set of screens, information, etc., to the RAC 130, and the assigned agents use only the screens, information, etc., previously sent to the RAC 130. In any event, the assigned agents appear to be part of the contact center 140.

A remote agent 100 may be simultaneously assigned to two or more contact centers 140, with the connections to the agent being routed through the RAC 130 and thereby switched between the contact centers 140 on an as needed basis, as available basis, first to request basis, etc., as agreed upon by the RAC 130 with the contact centers 140. Thus, the switching of connections between the remote agent 100 and a contact center 140 are accomplished in real time and seamlessly via the RAC 130. This is particularly useful in cases where one or more contact centers 140 have need of an agent certified in a particular skill area but do not have sufficient contact volume to require the full time or dedicated services of the remote agent 100. For example, a remote agent 100 could be handling a contact regarding automobile sales for one contact center 140 one minute, and then handling a contact regarding home appliances for another contact center 140 the next minute. In an alternative embodiment, the RAC 130 sends instructions to the Communications Network 120 as to the connections to be made between the remote agent 100 and any contact center 140.

As an example of the operation of the present invention, assume that the contact center 140A has a need for ten agents for collections in very late accounts (overdue more than 90 days). The RAC 130 will assign ten such remote agents 100 to that contact center 140A. Note that the RAC 130 does not just assign any ten agents. Rather, these ten agents have been trained, tested, and certified in collecting on very late accounts. Further, the remote agents will be allocated based on each agent's schedule and availability. Thus, rather than being assigned ten agents of unknown quality, the contact center 140A receives the benefit of ten agents skilled in the area needed by the contact center. Note also that the contact center 140A did not need to hire or train any agents. The burden of hiring and training was borne by the RAC 130. Further note that these ten agents receive the same screens, information, etc., that an agent located at the contact center 140A would receive. Thus, the contact center 140A is still in complete control of its business, including control of information and services it offers, and over the agents assigned from the RAC 130.

As another example, assume that a contact center 140B handles customer contacts for a manufacturer of household major appliances, such as refrigerators, washers, and dryers, and that the contact center 140B has its own core staff of agents for handling service and information request contacts from those customers, but that today the number of incoming contacts from customers is far above normal due to, for example, a recent advertising campaign by the manufacturer. If the contact center 140B does not answer the contacts, or leaves the contacts unanswered for an excessive time, then the effectiveness of the recent advertising campaign will be adversely impacted as potential customers will grow tired of being on hold, or of the contacts not being answered, and these potential customers will lose interest in the manufacturing company and its products. This will adversely affect the business relationship between the contact center 140B and the manufacturing company. Therefore, the contact center 140B would need to have extra agents on hand to handle the possible increased volume of incoming contacts, even if that volume did not increase. This increases the costs of the contact center 140B, which the contact center 140B may not be able to pass on to the manufacturing company. Thus, the contact center 140B is normally faced with the choice of underestimating the number of agents required to handle the contacts for the manufacturing company, thereby losing customers for the manufacturing company, or overestimating the number of agents required to handle the contacts for the manufacturing company, thereby increasing the costs and reducing the profits of the contact center 140B. However, the present invention allows the contact center 140B to provide the normal core group of agents to service the contacts for the manufacturing company. The contact center 140B places a variable order to the RAC 130 for up to N agents who are knowledgeable in major household appliances. The RAC 130 then identifies N agents from the resources pool who are certified in major household appliances and assigns these agents to service the contacts for the contact center 140B on an as-needed basis as the agents' schedules permit. Again note that the RAC 130 does not just assign any N agents. Rather, these N agents have been trained, tested, and certified as being capable of handling contacts regarding major household appliances, and are available. Thus, rather than being assigned ten agents of unknown quality, the contact center 140B receives the benefit of up to N agents skilled in the area needed. Note also that the contact center 140B did not need to hire or train any additional agents, or be concerned with under staffing of agents. The burden of hiring and training was again borne by the RAC 130. Now, when the number of incoming contacts becomes excessive, the contact center 140B routes the excessive incoming contacts to the RAC 130, which routes the contacts to the N assigned remote agents. Further note that these N remote agents receive the same screens, information, etc., that an agent located at the contact center 140B would receive. Thus, the contact center 140B is still in complete control of its business, including the remote agents assigned from the RAC 130.

In an alternative embodiment, the RAC 130 provides for training and certification of the agents, and assigning of the agents to the contact centers 140, but does not provide the connectivity between the remote agents 100 and the contact centers 140. In this embodiment, the agents would directly log in to the assigned contact center 140 through the Communications Network 120 and be directly under the control of the assigned contact center 140.

It should be noted that a contact center 140 may be a dedicated or internal contact center, that is, a contact center which is part of the customer relations and servicing department of a company, such as a manufacturer or seller of products or services. In this case, the company might have its own staff of agents who normally handle the contacts for the company, but the RAC 130 would be supplementing the resources, or providing different resources than those normally employed by the company.

Note that the present invention allows the contact centers 140 to staff normally, including no staff at all if that is the mode of operation, and obtain skilled, qualified agents as needed from the RAC 130. Thus, the contact center does not need to have spare agents on duty to handle expected or unexpected increases in contact volume. Also, the contact center 140 does not need to go to the trouble and expense of hiring and training agents. The RAC 130 provides the agents to the contact centers 140 as needed, and also provides for the hiring and training of the agents.

When remote agents 100 are not required by one contact center 140, they are assigned to another contact center 140, or are scheduled for additional or supplementary training so that each remote agent 100 may be trained and certified in a plurality of areas. Thus, each remote agent 100 can efficiently service many different types of calls and businesses.

Remote agents may be assigned by the RAC 130 to a contact center 140 according to the requirements of the contact center. That is, a remote agent may be assigned for a particular campaign or campaigns, for a specified time, for a specified number of contacts, on an as-needed basis for overflow contacts, for up to N agents, a combination thereof, etc.

Remote agents who are not assigned exclusively to one contact center 140A, such as agents assigned on an as-needed basis for overflow contacts, may be assigned to other contact centers, such as contact center 140B, or contact centers 140B and 140C, on an as-available basis.

Thus, the RAC 130 has a plurality of agents, but the agents are not idle as they are assigned "permanently", as needed, or as available, to the contact centers 140, or are being further trained and certified.

The present invention further provides for adjusting the contacts placed for one contact center 140 based upon the availability or non-availability of remote agents due to the contacts of another contact center. For example, assume that a plurality of remote agents 100 are assigned to contact center 140A on an as-needed basis, and assigned to contact center 140B on an as-available basis for outbound contacts. Assume now that the contacts for contact center 140A increase so that more remote agents are needed for contact center 140A, or the duration of the contacts increase so that the remote agents are less frequently available for other contacts. The RAC 130 will advise the contact center 140B of the change in statistics for the remote agents and the contact center 140B will reduce the rate at which outbound contacts are placed and/or the number of outbound contacts being placed. Predictive dialing programs (algorithms), also called call pacing programs (algorithms), may be used to control the rate of telephone contacts and are well known in the art.

In the prior art, a contact center may simultaneously run a plurality of campaigns, and one campaign may affect another campaign. However, the prior art does not provide for the activities of one contact center 140A to affect the activities of another contact center 140B. Thus, both contact centers may improperly staff for a campaign or for a period of time.

In still another embodiment, one or more of the contact centers 140 does not directly place or receive contacts, or may have only a specified number of lines available for such contacts. In this case, all contacts, or the excess contacts, are placed or received via the RAC 130. In effect, the RAC 130 acts as the communications arm of the contact center 140. The RAC 130 may therefore be considered to be a contact center which has other contact centers 140 as its customers.

It will be noted that the present invention allows the activities of one contact center 140A to affect the activities of another, completely independent contact center 140B in a manner that is beneficial for both independent contact centers. The provision of RAC 130 allows these independent contact centers to share remote agents who are not employees of either contact center.

An additional benefit of this invention is simultaneous communications between a customer 150A and multiple remote agents, such as remote agents 100A and 100B. If remote agent 10A, while assisting the customer 150A, realizes that another remote agent or agents with different or additional or supplementary skills is needed or desired, remote agent 100A can conveniently add remote agent 100B and any other necessary or desired remote agents to the connection. Thus, two or more remote agents 100 can simultaneously collaborate to resolve issues for the customer 150A. The procedures and equipment needed for setting up and accomplishing simultaneous connections are well-known in the art. The remote agent 100A is not limited to conferencing in other remote agents 100 to assist the customer. The remote agent 100A can also conference in other parties, such as a technical representative at a manufacturing company, to assist in a case where the customer asks a technical or detailed question that requires knowledge or information beyond the knowledge or information normally available to the remote agents 100. Utilizing this invention, multiple business entities may collaborate and present a unified single source to the customer to solve all of the customer's problems associated with a particular product or service. This type of collaborative resource sharing allows for best service, fastest responses, and lowest costs.

In another embodiment, the RAC 130 is jointly owned and operated by a plurality of contact centers 140.

In still another embodiment, the RAC and CC are one and the same. In such a situation, the support equipment resides in the CC and all functions of the RAC are performed by the CC.

It should also be noted that the remote agents may engage in any number of business activities. For example, but not by way of limitation, they may receive work in the form of telephone calls in the classic call center genre, they may supervise others, they may "work" documents, such as by translating, correcting, drafting, revising, etc., they may engage in electronic contact or communications by sending, receiving, evaluating, collecting, drafting, or compiling electronic mail or electronic conversations or communications, or any number or type of other business activities.

Finally, it should be noted that remote agents will bring great flexibility, as well as opportunities, to the market place. The hours worked by each agent may range from a few to many, the days worked may range from occasionally to regularly, the time of work may be standard working hours or off hours late at night. The remote agents will be able to work when they please from where they please. This increased flexibility will also benefit businesses wishing to staff contact centers at all times, help businesses retain top quality agents, and ensure the availability of knowledgeable agents. The modes of compensation may be as variable as the modes of work; compensation could be based on the contact, the hour, salary, or otherwise. Based on the compensation model selected, a business may be able to "hold" particular agents for that business' contacts. Such may occur when a business desires to release limited confidential information to agents. Those agents may be "held" from working for competing businesses. This invention opens the doors to many opportunities for workers and businesses.

Turn now to FIGS. 2A-2D, which are a flow chart of the operation of the present invention. The process begins at step 200 when the RAC 130 determines a need for remote workers or agents in general, or remote workers or agents having particular skill(s). The RAC 130 then posts an advertisement or job offer or request for such remote agents, such as on the RAC 130 web site, or another web site, or in newspapers or magazines. A person then learns of the need for such remote agents from the web site(s), newspapers, magazines, etc. That person will then log onto the advertised web site, portal, or service provider, and submit or post a request for the position, such as to perform as a remote agent. The RAC 130 then receives an application from a prospective remote agent 100.

Steps 205, 210 and 215 are optional. If implemented then, in step 205, the applicant's workstation may be evaluated to determine its characteristics and communications capabilities. For example, can the applicant simultaneously send and receive voice and data, or just one? Does the applicant have a color monitor, or just black and white? Does the applicant have a 17 inch screen, or a 14 inch screen? Does the applicant's computer have sufficient hard disk space, RAM, video RAM, and speed? Does the applicant's computer have a sound card, a CD-ROM player, a floppy disk drive? Some characteristics, such as simultaneous voice and data, may not be important in some cases, such as where the agent will simply be receiving and replying to e-mail messages. If the applicant's work station is adequate, the applicant is further evaluated. If not, a notice of minimum workstation requirements is sent with the rejection to the applicant at step 215.

At step 220, the applicant is initially evaluated or tested to determine what further or other qualification test(s) should be utilized. The qualification tests may be driven by a number of factors such as work desired, past experience, schedule, skills, etc. If the application is of the type which has a plurality of blocks which may be checked then the application may be automatically processed to determine the tests which are to be sent. If the application is of the type in which the applicant describes himself or herself in writing, then the document may be scanned and handwriting analysis used to determine the words and identify key words such as "sales" or "collections" and then the key words may be automatically processed to determine which tests are to be sent. In another version, a human may review the application to determine the qualification tests to be sent, or may later verify the tests to be sent. In still another version, a standardized set of tests, multimedia interactive or electronic, may be sent to each applicant.

In step 225, the appropriate qualification test(s) are forwarded to the applicant for completion. In still another embodiment, the application and the qualification test(s) are available online or over the Internet, and the applicant downloads and completes them both, and then submits them both to the RAC 130. The qualification test(s) may simply require confirmation that a person has a claimed skill. For example, the RAC 130 may require independent proof of license, educational degree, training, etc.

The applicant completes the test(s) and sends them back to the RAC 130. In step 230, the RAC receives and evaluates the completed qualification test(s) from the applicant. Some tests, such as typing speed tests, typing error tests, multiple choice answers, etc., may be automatically evaluated. Other qualification tests, such as listening skills, speaking and courtesy tests, may be evaluated by a human, or by an automated process, without human assistance.

Upon evaluation of those tests, the applicant is accepted or rejected for employment at step 235.

If the applicant was rejected then in step 240 the RAC advises the applicant of same, of opportunities for retesting, of other opportunities, etc.

If the applicant was accepted then in step 245 the RAC advises the applicant. Next, at step 250, the RAC prioritizes work demands and sends one or more training programs, which include one or more certification tests, to the applicant for completion. It is possible and likely that the applicant will need no training due to past accomplishments or an established skill set. It is further contemplated that remote agents will constantly be receiving additional training as necessitated by the evolution of the marketplace.

The agent completes the training programs and sends them back to the RAC for evaluation. In step 255 the RAC receives and evaluates the certification tests from the training program. As in step 230, depending upon the training program and the nature of the tests, the tests may be evaluated automatically and/or by a human.

If at step 260 the agent has not successfully completed the training program(s) then, in step 265, the RAC provides remedial or additional training for the agent, provides a report of the test results for consideration by a human whether to terminate the employment, or takes other action.

If at step 260 the agent has successfully completed the training program(s) then, in step 270 the agent is certified for the area of the training program. Also, depending upon the level of the training program, or the agent's score, the proficiency level of the agent will be assigned.

Steps 250, 255, 260, 265 and 270 are optional and may be used, for example, if additional verification of the claimed skills or proficiency is desired, or if it is desired to certify agents for new areas.

In step 275, the agent is placed into the resource pool. Once in the resource pool, the agent sends the RAC 130 the schedule of when the agent is available for work. The RAC 130 thus obtains a schedule of each agent's availability, as in step 280. If the agent has not submitted a schedule, then the RAC 130 operates under the assumption or rule that the agent is available any time that the agent is logged in.

In step 285 the RAC 130 receives a request from a contact center 140 for one or more agents 100 who are qualified in a certain area or areas. Preferably the request is in a format which can be processed automatically. Alternatively, the request can be processed by a human at the RAC 130.

In step 290 the RAC inspects the resource pool and identifies the agents having the requested qualifications. This is preferably performed automatically as the agents' qualifications and certifications are known and stored in a database and the request of the contact center is used to identify agents having desired qualifications.

If at step 295 it is determined that there are no agents or insufficient agents to fulfill the work request, a return to step 250 is made in order to train additional agents to have the requested qualifications so that, next time, the work request can be fulfilled.

In step 300, the RAC 130 identifies qualified agents who are available and assigns agents based on proficiency, the skills of the agents, and the profile of the agents. Those agents are assigned to the requesting contact center under the requested conditions, such as permanently, as needed, as available, etc. By doing so, the RAC 130 is ensuring that the best agents possible are assigned the work. In turn, this will motivate agents to obtain additional training so they can increase their proficiency scores.

The work is then delivered to the agents in step 305. Delivery of the work may be achieved by a multitude of ways. For example, the work may require that contacts are routed directly to the agents via the Communications Links 115. In synchronous contacts, the live transaction with the customer is the work. Alternatively, distinct work assignments may be forwarded to the agent in soft form via the Communications Links 115, or in hard form pursuant to traditional data transfer methods (mail, facsimile, or other delivery). These latter contacts are asynchronous in that the agent receives the work, creates a result, and forwards the result back to the originator.

Optionally, in step 310, the work performed by the agent is evaluated. The evaluation may be by various means including, but not limited to, listening in as an agent deals with live contacts, reviewing the work product generated by the agent, or querying the contact center to learn the quality of the work. This evaluation, combined with training, may be used to establish or update each agent's proficiency rating.

Step 315 determines whether the request of the contact center has been completed. If not, the process reverts back to step 285. If so, then in step 320 the RAC, preferably automatically, processes the completed business transaction and generates a billing record for that contact center for that request.

The billing record may be based upon the area of certification of the agent, the proficiency rating of the agent, whether the agent is permanently assigned, assigned as needed, assigned as available, the number of contacts, the duration of the contacts, the day, the time, whether the RAC or the contact center is performing outgoing contact management or incoming contact management, whether the RAC or the contact center is doing the contact pacing, what agent statistics are requested by the contact center for its contact pacing algorithm, the type of communication (e-mail, fax, voice, collaborative communications), a combination of two or more of these factors, etc.

It will therefore be appreciated that the present invention provides a valuable improvement over stand-alone contact centers in that agents are independently trained and certified in specified areas, in that agents may not be directly employed by the contact centers but are temporarily assigned to the contact centers for a particular campaign by an agent training and certification center, and in that contact centers can avoid the expense and effects of staffing, hiring, training, retraining, and retaining employees, and overstaffing or understaffing.

It will also be appreciated that, although the preferred embodiment of the present invention is with respect to contact centers, the present invention is not so limited. Rather, the present invention may be used for selecting, training, testing, certifying, and assigning personnel among a plurality of external or independent parties.

From a reading of the description above of the preferred embodiment of the present invention, modifications and variations thereto may occur to those skilled in the art. Therefore, the scope of the present invention is to be limited only by the claims below.

We claim:

1. A method for allocating a resource pool of remote workers among two or more contact centers serving a plurality of external parties, comprising the steps of: providing a remote agent center; certifying a plurality of remote workers in a plurality of skill areas, said step of certifying comprising at least one of testing, training or verification; placing said certified remote workers in said resource pool; receiving a request from an external party for a remote worker having a specified skill; inspecting said resource pool to identify remote workers in said resource pool which are certified for said specified skill; assigning at least one such identified remote worker to serve said external party; connecting said identified remote worker to said external party through said remote agent center; and providing services for said external party by said identified remote worker through said remote agent center.

2. A method of allocating contact center remote workers simultaneously among a plurality of external parties and switching said remote contact center workers between external parties, comprising: receiving a request for a remote worker having a specified skill from a first external party; receiving a request for a remote worker having said specified skill from a second external party; identifying a remote worker having said specified skill; connecting said identified remote worker to said first external party on an as-needed basis; providing services for said first external party by said identified remote worker through said remote agent center on an as-needed basis; connecting said identified remote worker to said second external party on as-available basis; and providing services for said second external party by said identified remote worker through said remote agent center on an as-available basis.

3. A method of allocating remote workers simultaneously among a plurality of external parties, comprising: providing a remote agent center; receiving a request for a remote worker having a specified skill from a first external party; receiving a request for a remote worker having said specified skill from a second external party; identifying a remote worker having said specified skill; connecting said identified remote worker to said first external party on an as-needed basis to perform work for said first external party through said remote agent center; providing services for said first external party by said identified remote worker through said remote agent center on an as-needed basis; connecting said identified remote worker to said second external party on as-available basis to perform work for said second external party through said remote agent center; and providing services for said second external party by said identified remote worker through said remote agent center on an as-available basis.

4. A method of allocating and switching contact center, remote agents among a plurality of external parties serviced by one or more contact centers, comprising: receiving a request for a remote agent having a specified skill from a first external party, wherein first external party is a first contact center; receiving a request for a remote agent having said specified skill from a second external party, wherein said second external party is a second contact center; identifying a remote agent having said specified skill; connecting said identified remote agent to said first external party on an as-needed basis; providing services for said first external party by said identified remote agent through said remote agent center on an as-needed basis; connecting said identified remote agent to said second external party on as-available basis; providing services for said second external party by said identified remote agent through said remote agent center on an as-available basis; and providing statistics regarding said remote agent to said contact centers as an input to determine agent availability; wherein said input is used by said contact centers as an input to a predictive dialing algorithm at said contact centers.

5. A method of allocating call center, remote workers among a plurality of external parties serviced by multiple contact centers, comprising: providing a remote agent center; receiving a request for a remote worker having a specified skill from a first external party, wherein said first external party is serviced by a first contact center; receiving a request for a remote worker having said specified skill from a second external party, wherein said second external party is serviced by a second contact center; identifying a remote worker having said specified skill; connecting said identified remote worker to said first external party on an as-needed basis; connecting said identified remote worker to said second external party on as-available basis, wherein said identified remote worker is simultaneously connected to said first external party and said second external party through said remote agent center; providing tools to said remote worker by said remote agent center to performing services for said first external party and said second external party; providing statistics regarding said identified remote worker to each said contact center as an input to be used by said contact centers to determine availability of agents; wherein said input is used by a predictive dialing algorithm used by said contact centers to determine availability of agents.

6. A method of allocating a plurality of remote workers to assist an external party in servicing contacts by customers, comprising: receiving a request for a first remote worker having a first specified skill from an external party; identifying a remote worker having said first specified skill; connecting said identified first remote worker to a first customer of said external party; receiving a request for a second remote worker having a second specified skill from said external party; identifying a second remote worker having said second specified skill; connecting said second identified remote worker to a second customer of said external party; providing a remote agent interface to said first identified worker; servicing said first customers of said external party by said first identified remote worker through said remote agent interface; providing said remote agent interface to said second identified worker; and servicing said second customers of said external party by said second identified remote worker through said remote agent interface.

7. A method of allocating a plurality of remote workers to assist an external party, comprising: providing a remote agent center; receiving a request for a first remote worker having a first specified skill from an external party; identifying a remote worker having said first specified skill; connecting said identified first remote worker to said external party through said remote agent center; providing services for said external party by said first identified remote worker through said remote agent center; receiving a request for a second remote worker having a second specified skill from said external party; identifying a second remote worker having said second specified skill; connecting said second identified remote worker to said external party through said remote agent center; and providing services for said external party by said second identified remote worker through said remote agent center.

8. A method of allocating a plurality of remote workers to assist an external party, comprising: receiving a request for a first remote worker having a first specified skill from an external party; identifying a remote worker having said first specified skill; providing a remote agent center to said remote worker; connecting said identified first remote worker to said external party; providing services for said external party by said first identified remote worker through said remote agent center; receiving a request for a second remote worker having a second specified skill from said external party; identifying a second remote worker having said second specified skill; providing said remote agent center to said second remote worker; connecting said second identified remote worker to said external party; and providing services for said external party by said second identified remote worker through said remote agent center; wherein a remote agent center coordinates activities of said identified first remote worker and said identified second remote worker; and providing statistics regarding said identified first remote worker and statistics regarding said identified second remote worker to said remote agent center as inputs to be used by said remote agent center to determine availability of remote workers; wherein said inputs are used by a predictive dialing algorithm used by said remote worker center to determine availability of remote workers.

9. The method of claim 1 wherein said step of inspecting said resource pool further comprises reviewing said resource pool to determine availability of said identified remote worker based on a schedule of availability provided by said identified remote worker.

10. The method of claim 1 wherein said step of connecting comprises connecting said identified remote worker to said external party through a single connection at said remote agent center, said single connection providing for both voice and data transfer.

11. The method of claim 1 wherein said step of connecting comprises connecting said identified remote worker to said external party through separate voice and data connections at said remote agent center.

12. The method of claim 1 further comprising the step of transferring data between said external party and said remote agent through a data connection at said remote agent center.

13. The method of claim 1 wherein said step of connecting comprises connecting said identified remote worker to said external party through a dial-up connection at said remote agent center.

14. The method of claim 1 wherein said step of certifying further comprises obtaining information regarding characteristics of a workstation available to each said remote worker; evaluating said characteristics of said workstation; and certifying a said remote worker for a said skill area only if said characteristics of said workstation are suitable for said skill area.

15. The method of claim 1 wherein said step of certifying comprises electronically testing.

16. The method of claim 1 wherein said step of certifying comprises electronically training.

17. The method of claim 3 wherein said steps of connecting comprise connecting said identified remote worker to said external parties through a single connection at said remote agent center to said identified remote worker, said single connection providing for both voice and data transfer.

18. The method of claim 3 wherein said step of connecting comprises connecting said identified remote worker to said external parties through separate voice and data connections at said remote agent center.

19. The method of claim 3 wherein said step of connecting comprises connecting said identified remote worker to said external parties through a dial-up connection at said remote agent center.

20. The method of claim 3 further comprising the step of transferring data between said external party and said remote worker through a data connection at said remote agent center.

21. The method of claim 3 wherein said first external party is a first contact center, said second external party is a second contact center, and further comprising the step of providing statistics regarding said remote worker to said contact centers as an input to determine agent availability.

22. The method of claim 3 wherein said identified remote worker is simultaneously connected to said first external party and said second external party.

23. The method of claim 7 wherein said step of connecting comprises connecting said identified remote workers to said external party through connections, each identified remote worker being connected via a single connection to said remote agent center, each said single connection providing for both voice and data transfer.

24. The method of claim 7 wherein said step of connecting comprises connecting said identified remote workers to said external party through separate voice and data connections at said remote agent center.

25. The method of claim 7 wherein said step of connecting comprises connecting said identified remote workers to said external party through a plurality of dial-up connections at said remote agent center.

26. The method of claim 7 further comprising the step of transferring data between said external party and said remote workers through data connections at said remote agent center.

27. The method of claim 7 wherein a remote agent center coordinates activities of said identified first remote worker and said identified second remote worker, and further comprising the step of providing statistics regarding said identified first remote worker and statistics regarding said identified second remote worker to said remote agent center as inputs to be used by said remote agent center to determine availability of remote workers.

28. The method of claim 7 wherein said external party is simultaneously connected to said identified first remote worker and to said identified second remote worker.

29. The method of claim 7 wherein at least one said step of connecting comprises connecting a said identified remote worker to said external party on an as-needed basis.

30. The method of claim 7 wherein at least one said step of connecting comprises connecting a said identified remote worker to said external party on an as-available basis.

31. The method of claim 22 and further comprising the step of providing a remote agent center, and wherein said step of connecting comprises connecting said identified remote worker to said external parties through said remote agent center.

32. The method of claim 28 and further comprising the step of providing a remote agent center, and wherein said step of connecting comprising connecting said identified remote workers to said external party through said remote agent center.

33. The method of claim 28 wherein said step of connecting comprises connecting said identified remote workers to said external party through separate voice and data connections at said remote agent center.

34. The method of claim 28 further comprising the step of transferring data between said external party and said remote workers through data connections at said remote agent center.

35. The method of claim 28 further comprising the step of sending data regarding said external party from said remote agent center to said remote workers through a data connection.

36. The method of claim 31 wherein said step of connecting comprises connecting said identified remote worker to said external parties through a single connection at said remote agent center to said identified remote worker, said single connection providing for both voice and data transfer.

37. The method of claim 31 wherein said step of connecting comprises connecting said identified remote worker to said external parties through separate voice and data connections at said remote agent center.

38. The method of claim 31 wherein said step of connecting comprises connecting said identified remote worker to said external parties through a dial-up connection at said remote agent center.

39. The method of claim 31 further comprising the step of transferring data between said external parties and said remote worker through a data connection at said remote agent center.

40. The method of claim 31 wherein first external party is a first contact center, said second external party is a second contact center, and further comprising the step of providing statistics regarding said identified remote worker to each said contact center as an input to be used by said contact centers to determine availability of agents.

41. The method of claim 32 wherein said step of connecting comprises connecting said identified remote workers to said external party through connections, each identified remote worker being connected via a single connection to said remote agent center, each said single connection providing for both voice and data transfer.

42. The method of claim 32 wherein said step of connecting comprises connecting said identified remote workers to said external party through a plurality of dial-up connections at said remote agent center.

* * * * *